United States Patent Office 2,872,457
Patented Feb. 3, 1959

2,872,457

PROCESS FOR THE PREPARATION OF 4-HYDROXYCOUMARIN DERIVATIVES

Collin H. Schroeder, Madison, and Karl Paul Link, Middleton, Wis., assignors to Wisconsin Alumni Research Foundation, Madison, Wis., a corporation of Wisconsin No Drawing. Application April 19, 1956
Serial No. 579,172

3 Claims. (Cl. 260—343.2)

The present invention relates to an improved process of preparing 3-alkyl-4-hydroxycoumarins and in particular 3-($\alpha$-R-benzyl)-4-hydroxycoumarins, where R is a lower alkyl group.

In Jubilee Vol. Emil Barell, page 242 (1946), Grüssner reported the prepartion of 3-allyl-4-hydroxycoumarin by a process involving the reaction of allyl bromide and 4-hydroxycoumarin carried out in an alcohol-aqueous sodium hydroxide solution in the presence of powdered copper. The preparation of the related 3-cinnamyl- and 3-nitrocinnamyl-4-hydroxycoumarins by the same process was also reported by Grüssner. Attempts to prepare 3-($\alpha$-alkyl-benzyl)-4-hydroxycoumarins such as the 3-($\alpha$-ethylbenzyl)-4-hydroxycoumarin by the Grüssner process, however, resulted in only poor yields running around 10 to 15 percent. Attempts to solve the problem by the use of the Pauly-Lockemann synthesis also proved unsatisfactory due to the difficulty encountered in the preparation of the substituted acid chloride intermediates required for this synthesis. With further investigation it was discovered that the desired products could be readily prepared in substantially quantitative yield (98–100%) by merely melting or fusing the halide with 4-hydroxycoumarin.

The following examples will serve to illustrate the invention.

EXAMPLE I

*3-($\alpha$-ethylbenzyl)-4-hydroxycoumarin*

A mixture of 0.1 mole of 4-hydroxycoumarin and 0.1 mole of 1-bromopyropylbenzene is heated in a 100 ml. round bottom flask in an oil bath at a temperature of 135–140° C. for about one-half hour. After cooling the reaction mixture is dissolved in 150 ml. of 5 percent aqueous sodium hydroxide. The alkaline solution is next extracted several times with ethyl ether to remove unreacted halides. The alkaline solution is then poured slowly with stirring into ice and excess hydrochloric acid solution. The resulting precipitate is collected on a filter and washed several times with water. The residue is slurried in 1600 ml. of water and heated to boiling and filtered while hot to remove unreacted 4-hydroxycoumarin. The remaining solid after recrystallization from ethanol yields the desired product, 3-($\alpha$-ethylbenzyl)-4-hydroxycoumarin, with a melting point of 176–178° C.

EXAMPLE II

*3-($\alpha$-propylbenzyl)-4-hydroxycoumarin*

This product is prepared in accordance with Example I by reacting molecular equivalents of 4-hydroxycoumarin and 1-bromobutylbenzene at a temperature of 170° C. for about 0.5 hour. After recrystallization from ethanol or ethanol-water mixture, it is obtained with a melting point of 191–194° C.

EXAMPLE III

*3-($\alpha$-butylbenzyl-4-hydroxycoumarin*

This product is prepared in accordance with Example II employing 1-bromoamylbenzene. After recrystallization it has a melting point of 179–180° C.

EXAMPLE IV

*3-($\alpha$-amylbenzyl)-4-hydroxycoumarin*

This product is prepared in accordance with Example II employing 1-bromohexylbenzene. After recrystallization, it has a melting point of 148–149° C.

EXAMPLE V

*3-($\alpha$-methylbenzyl)-4-hydroxycoumarin*

This product is prepared in accordance with Example I employing 1-bromoethylbenzene. After recrystallization, it has a melting point of 201–202° C.

The products of Examples I–V inclusive, described above, are obtained in approximately 100 percent yield. While the process of the invention is particularly adaptable for use for preparing this type of product involving a secondary halide (bromide or chloride) intermediate, the process can be employed to advantage to prepare the following products.

EXAMPLE VI

*3-benzyl-4-hydroxycoumarin*

This product is prepared in accordance with the above examples by heating a mixture of bromomethylbenzene and 4-hydroxycoumarin at 180° C. for about 0.5 hour. It has a melting point of 194–197° C.

EXAMPLE VII

*3-($\beta$-phenylethyl)-4-hydroxycoumarin*

This product is prepared in accordance with Example VI employing 2-bromoethylbenzene and a heating period of about 0.75 hour. It has a melting point of 195–200° C.

EXAMPLE VIII

*3-(o-methylbenzyl)-4-hydroxycoumarin*

This product is prepared in accordance with Example VI employing o-bromomethyl-toluene and a temperature of 175° C. It has a melting point of 204–207° C.

EXAMPLE IX

*3-(o-chlorobenzyl)-4-hydroxycoumarin*

This product is prepared in accordance with Example VI employing o-bromomethylchlorobenzene and a heating period of about 1 hour at 185° C. It has a melting point of 231–240° C.

Except for the product of Example VIII which is obtained in good yield, the products of Examples VI–IX, are obtained in considerably lower yield (24–90%) than the yields of the products of Examples I–V. The reaction will go, however, with primary halides in which the halide is on the $\alpha$ and $\beta$ carbon atom (see Examples VI and VII), but will not go when the halide atom is on the $\gamma$ or third carbon from the phenyl ring. The full mechanism of the reaction is not understood but it appears and particularly so with the secondary halides with the halide in the $\alpha$-position (i. e. next to the phenyl ring), that the hydrogen halide liberated during the reaction catalyzes the reaction giving unexpectedly and exceptionally high yields.

Chlorides and iodides can be used in place of the bromides described in the examples, although the use of the iodides is generally avoided as they tend to be relatively unstable compared to the bromides and chlorides. The temperatures employed for the reaction on the one hand should be sufficiently high to melt the reactants and on the other hand below the point at which the reactants decompose.

The products produced by the improved process of the present invention have potent anticoagulant properties and can be used in the rodenticide field in the same manner that warfarin is widely used today. While the products of Examples I and II have been found to have approximately twice the potency of warfarin in single doses, their use in the approximate concentrations as warfarin (0.025% by weight in food bait such as corn meal) is recommended.

The alkali metal, e. g. sodium, derivative of the product of Example I can be prepared by adding an excess of the 3-alkyl-4-hydroxycoumarin to aqueous sodium hydroxide, filtering to remove the excess 4-hydroxycoumarin, treating with activated carbon, filtering, concentrating the clear filtrate under vacuum to a thick syrup, adding ethanol and concentrating again to apparent dryness. Absolute ethanol is then preferably added and removed under vacuum to produce a friable mass that can be readily ground to a fine powder. The sodium derivatives can be used in the same manner that warfarin sodium is used in the rodenticide-water bait field.

The process is relatively simple and inexpensive to operate and yields the desired products in high yield. For rodenticide purposes the products should be purified by recrystallization as shown above.

We claim:

1. The process of preparing 3-alkyl-4-hydroxycoumarin which comprises melting a mixture of molecular equivalents of 4-hydroxycoumarin and a compound represented by the formula $$\text{R—CH—R}'$$
$$\phantom{\text{R—C}}|$$
$$\phantom{\text{R—CH—}}\text{X}$$

where R is selected from the group consisting of hydrogen and lower alkyl groups, X is selected from the group consisting of bromine and chlorine and R' is selected from the group consisting of phenyl and benzyl groups.

2. The process of preparing 3-($\alpha$-ethylbenzyl)-4-hydroxycoumarin which comprises heating a mixture containing molecular equivalents of 1-bromopropylbenzene and 4-hydroxycoumarin at a temperature of about 135–140° C. for about 0.5 hour.

3. The process of preparing 3-($\alpha$-propylbenzyl)-4-hydroxycoumarin which comprises heating a mixture containing molecular equivalents of 1-bromobutylbenzene and 4-hydroxycoumarin at a temperature of about 170° C. for about 0.5 hour.

References Cited in the file of this patent

UNITED STATES PATENTS 2,723,276   Güssner  ---------------- Nov. 8, 1955

FOREIGN PATENTS 1,035,566   France  ---------------- Apr. 22, 1953
1,070,465   France  ---------------- Feb. 24, 1954

OTHER REFERENCES

Dobner, Ann, 217, 227 (1883). (See Weygand: "Organic Preparations," p. 353, Interscience (1945).)